(12) United States Patent
Buschenhenke et al.

(10) Patent No.: US 10,677,283 B2
(45) Date of Patent: Jun. 9, 2020

(54) ASSEMBLED HALF SHELL-SHAPED FLANGED BEARING SHELL

(71) Applicant: KS Gleitlager GmbH, St. Leon-Rot (DE)

(72) Inventors: Frank Buschenhenke, Ostrhauderfehn (DE); Hubert Schroeder, Surwold (DE); Peter Heger, St. Leon-Rot (DE); Steffen Schieszl, St. Leon-Rot (DE); Manuel Reiser, Karlsbad (DE); Heinbert Langner, Rheda-Wiedenbrueck (DE); Stefan Treutner, Wiesloch (DE); Athanassios Skiadas, Darmstadt (DE); Torsten Fuellenbach, Wiesloch (DE); Wilfried Hoene, Taunusstein (DE); Stephan Burkhart, Lorsch (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 16/320,316

(22) PCT Filed: Jul. 27, 2017

(86) PCT No.: PCT/EP2017/069006
§ 371 (c)(1),
(2) Date: Jan. 24, 2019

(87) PCT Pub. No.: WO2018/019939
PCT Pub. Date: Feb. 1, 2018

(65) Prior Publication Data
US 2019/0353199 A1    Nov. 21, 2019

(30) Foreign Application Priority Data

Jul. 29, 2016 (DE) .................. 10 2016 114 132

(51) Int. Cl.
*F16C 9/02* (2006.01)
*F16C 17/10* (2006.01)
*F16C 33/04* (2006.01)

(52) U.S. Cl.
CPC ............... *F16C 9/02* (2013.01); *F16C 17/10* (2013.01); *F16C 33/046* (2013.01);
(Continued)

(58) Field of Classification Search
CPC .... F16C 9/02; F16C 9/04; F16C 17/10; F16C 33/046; F16C 2360/22
See application file for complete search history.

(56) References Cited

U.S. PATENT DOCUMENTS

| 5,520,466 A * | 5/1996 | Everitt .................... F16C 17/10 384/124 |
| 2003/0128902 A1* | 7/2003 | Kennedy .................. F16C 9/02 384/275 |

(Continued)

FOREIGN PATENT DOCUMENTS

| AT | 510062 A1 | 1/2012 |
| DE | 2433928 A1 | 2/1976 |

(Continued)

OTHER PUBLICATIONS

International Search Report and Written Opinion Form PCT/ISA/220 and PCT/ISA/237, International Application No. PCT/EP2017/0690006, p. 1-8, International Filing Date Jul. 27, 2017, dated Oct. 20, 2017.

*Primary Examiner* — Philip A Johnson
(74) *Attorney, Agent, or Firm* — Bond Schoeneck & King, PLLC; George McGuire

(57) ABSTRACT

An assembled half shell-shaped flanged bearing shell for a crankshaft bearing point in an internal combustion engine, having a half shell-shaped radial bearing part and having a disk-shaped axial bearing part that is fastenable in the area (Continued)

of an axial end-face side of the radial bearing part. The axial bearing part is formed from at least three segments that adjoin one another in the circumferential direction and that are nonreleasably joined together via a weld seam between every two segments, wherein the respective weld seam does not include the radial bearing part. The segments with their retaining tongues are first arranged on the edge area of the radial bearing part so that the retaining tongues engage with the respective retaining recesses in the edge area of the radial bearing part, and only then is the respective weld seam applied between every two segments, as a result of which the axial bearing part thus formed is captively held on the radial bearing part but with slight play, and in particular without the retaining tongues or the edge area of the radial bearing part having been machined in a material-shaping manner.

12 Claims, 4 Drawing Sheets

(52) U.S. Cl.
CPC ...... *F16C 2220/84* (2013.01); *F16C 2226/36* (2013.01); *F16C 2240/30* (2013.01); *F16C 2360/22* (2013.01)

(56) References Cited

U.S. PATENT DOCUMENTS

| | | | |
|---|---|---|---|
| 2010/0260449 A1* | 10/2010 | Lehmann | F16C 17/10 384/456 |
| 2014/0177987 A1* | 6/2014 | Roberto | F16C 17/10 384/275 |

FOREIGN PATENT DOCUMENTS

| | | | | |
|---|---|---|---|---|
| DE | 3730166 A1 | 3/1989 | | |
| DE | 102006027500 A1 | 12/2007 | | |
| EP | 2690295 A1 | 1/2014 | | |
| GB | 2516294 A | 1/2015 | | |
| JP | 6110332 B2 * | 4/2017 | | F16C 17/10 |
| WO | 2012129624 A1 | 10/2012 | | |

* cited by examiner

ASSEMBLED HALF SHELL-SHAPED FLANGED BEARING SHELL

CROSS-REFERENCE TO RELATED APPLICATION

The present application is the National Stage Application, filed under 35 U.S.C. 371, of International Patent Application No. PCT/EP2017/069006 filed on Jul. 27, 2017, which claims priority to German patent application No. 102016114132.1, filed on Jul. 29, 2016, contents of both of which are incorporated herein by reference in their entireties.

BACKGROUND OF THE INVENTION

The invention relates to an assembled half shell-shaped flanged bearing shell for a crankshaft bearing point in an internal combustion engine, having an axial direction, a circumferential direction concentric with respect to the axial direction, and a radial direction, and having a half shell-shaped radial bearing part and having a disk-shaped axial bearing part that is fastenable in the area of one or both axial end-face side(s) of the radial bearing part, wherein the radial bearing part has a radially inner sliding surface facing a sliding partner, and an edge area that extends in the circumferential direction, and wherein the axial bearing part extends essentially in a radial plane, i.e., orthogonally with respect to the axial direction, and has at least two inwardly projecting retaining tongues that extend essentially in the radial plane and that are brought into engagement with a respective retaining recess in the edge area of the radial bearing part, wherein the axial bearing part is captively held at the radial bearing part. The aim is to captively hold the respective axial bearing part at the radial bearing part, for which purpose it shall not be necessary to provide an integrally joined and thus rigid connection between the axial bearing part and the radial bearing part.

Assembled flanged bearing shells of the above-mentioned type are known. The axial bearing parts, with a circumferential length of approximately 180°, are typically punched from a flat material, and then captively fixed via retaining tongues that engage with retaining recesses on the radial bearing part, in that the retaining tongues or the edge area of the radial bearing part are/is plastically deformed, thus producing a rear engagement. This must also be the case in DE 24 33 928 A1 and in DT 21 40 845, referenced therein. Namely, there is no other way to captively arrange the axial bearing part in question on the radial bearing part with respect to all degrees of freedom, unless integrally joined connections were to be mounted between the axial bearing part and the radial bearing part. However, as the result of plastic deformation this is always accompanied by the risk of impairment of the dimensional stability of the components. In DE 24 33 928 A1 cited above, the axial bearing part includes multiple segments that adjoin one another in the circumferential direction. According to DE 10 2006 027 500 A1, an axial bearing ring that encompasses 360°, i.e., that is closed, is formed by detachable or nondetachable connection, in particular welding, of segments adjoining one another in the circumferential direction. Attachment of the axial bearing ring to a radial bearing part is not provided. WO 2012/129624 A1, in turn, discloses an embodiment with deformable retaining tongues. According to GB 2516294 A, a combined joining movement comprising supplying the axial bearing part, tilting, and hooking to the radial bearing part from behind results in an arrangement which, however, is not captive with respect to all degrees of freedom.

The object of the present invention is to provide an assembled half shell-shaped flanged bearing shell of the type mentioned at the outset, in which the above-described impairment of the dimensional stability is less problematic, wherein the axial bearing part in question is to be captively held on the radial bearing part with respect to all degrees of freedom, wherein no integrally joined and thus rigid connection between the axial bearing part and the radial bearing part is to be provided.

This object is achieved by a flanged bearing shell of the above-mentioned type, which is characterized in that the axial bearing part is formed from at least three segments that adjoin one another in the circumferential direction and that are nonreleasably joined together via a weld seam, preferably extending in the radial direction, between every two segments, wherein the respective weld seam does not include the radial bearing part, and wherein the segments with their retaining tongues are first arranged at the edge area of the radial bearing part so that the retaining tongues engage with the respective retaining recesses in the edge area of the radial bearing part, and only then is the respective weld seam applied between every two segments, as a result of which the axial bearing part thus formed is captively held on the radial bearing part but with slight play, at least in the axial direction, and without the retaining tongues or the edge area of the radial bearing part having been processed in a material-deforming manner. It has been found to be advantageous when the retaining recesses in the radial bearing part are not open at the edge, but instead are designed as closed insertion or passthrough openings.

SUMMARY OF THE INVENTION

According to the invention, an arrangement of the axial bearing part on the radial bearing part which is captive but which still has at least axial play may be achieved, specifically without providing material-shaping, in particular caulking, measures on the radial bearing part or on the axial bearing part. The dimensional stability of the flanged bearing shell thus formed may therefore be maintained without problems. Another significant advantage of the flanged bearing shell according to the invention is that for manufacturing the axial bearing part, a smaller cutting is made from the flat material, compared to the forming of axial bearing parts, extending over 180°, from the flat material.

A flanged bearing shell according to the invention may have an axial bearing part on only one side or on both sides. Accordingly, a bearing point having two flanged bearing shells according to the invention may have two, three, or four axial bearing parts.

One refinement of the invention may also prove advantageous when the multiple segments are not all made of the same materials or do not all have the same material composition. For example, it would be conceivable for a segment provided at the middle of the vertex of the flanged bearing shell to have a different material composition than adjoining segments. Different load situations may thus be taken into account, depending on the position of the axial bearing part.

It may prove advantageous when at least one segment is made of a metal/plastic composite, while other segments are made of metal or a metal composite. In particular, it may prove advantageous when the metal/plastic composite has a metallic support layer, in particular made of steel, a three-dimensionally porous support layer applied thereto for a polymer-based sliding material impregnated therein, and this sliding material, preferably with tribologically active fillers.

In addition, it has proven advantageous when all segments have a retaining tongue that preferably extends essentially radially inwardly.

Moreover, it has proven advantageous when three segments are provided for forming a particular axial bearing part, the segments each preferably having a circumferential length of 55°-65°, in particular approximately 60°, or two segments that have a shorter circumferential length than a segment situated between them.

It may also prove advantageous when segments having different circumferential lengths are provided. It is then possible to manufacture flanged bearing shells that better correspond to specific conditions, in particular in conjunction with a different material selection.

It has also proven advantageous when the particular segment in the radial direction has a cutout on the outside in the transition to an adjacent segment. As a result of this design, the segments may be formed from the flat material in close abutment, with a high material utilization rate.

In all the flanged bearing shells having a design according to the invention, pockets, openings, or grooves may be formed which supply or accommodate lubricant.

The subject matter of the invention further relates to a method for manufacturing an assembled half shell-shaped flanged bearing shell having the features of claims 8 and 9. A flanged bearing shell is hereby obtained in which the respective axial bearing part is captively held on the radial bearing part, for which purpose no integrally joined and thus rigid connection between the axial bearing part and the radial bearing part is provided.

Further features, particulars, and advantages of the invention result from the appended patent claims, the graphical illustrations, and the following description of one preferred embodiment of the invention.

DETAILED DESCRIPTION

Figure 1:
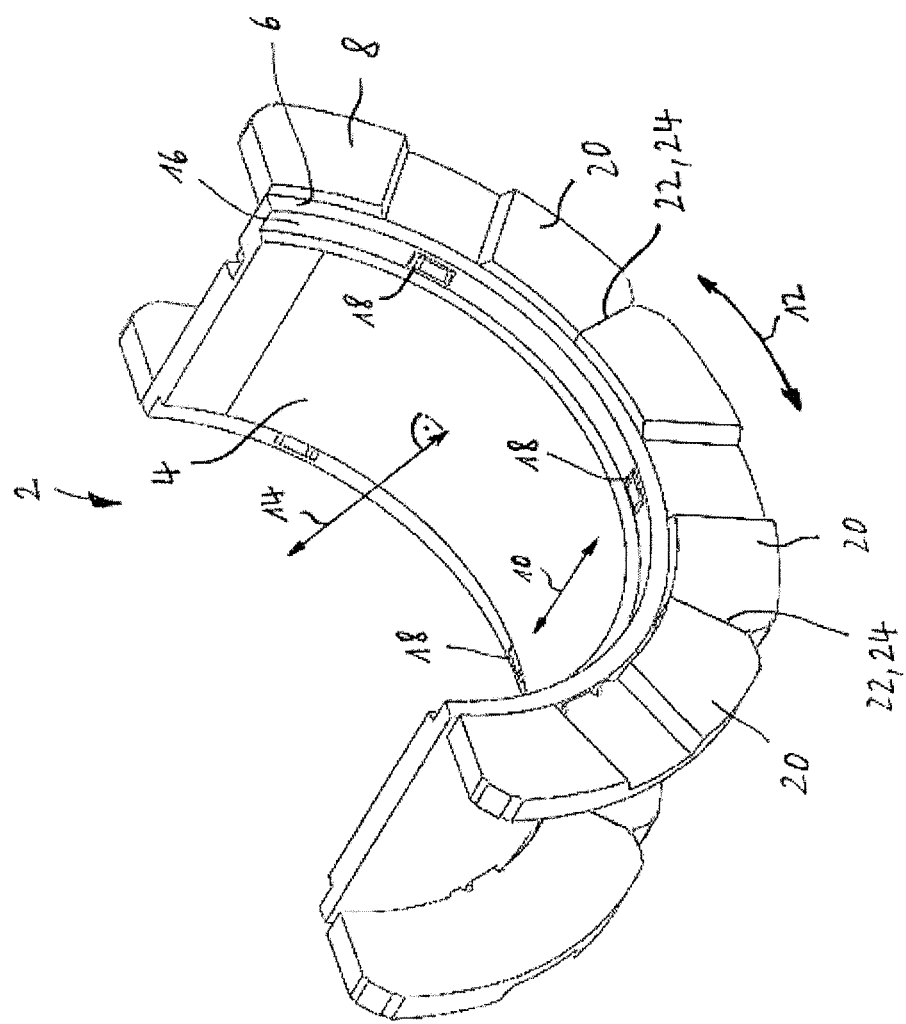
FIG. 1 shows a perspective view of an assembled half shell-shaped flanged bearing shell according to the invention.
Figure 2:
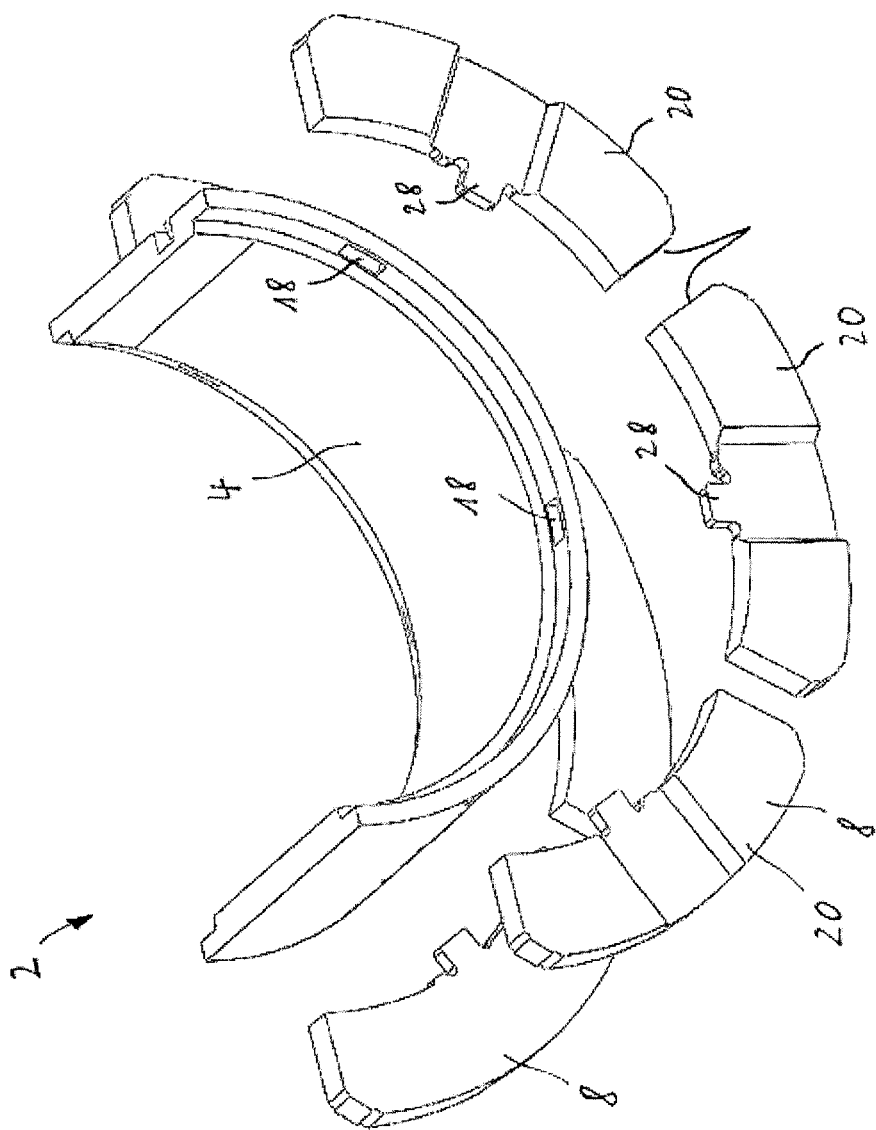
FIG. 2 shows an exploded illustration of the flanged bearing shell from FIG. 1.

An assembled half shell-shaped flanged bearing shell according to the invention, denoted overall by reference numeral 2, in particular for a crankshaft bearing point in an internal combustion engine, includes a half shell-shaped radial bearing part 4, i.e., encompassing approximately 180°, and in the case illustrated by way of example, a fastened axial bearing part 8, often also referred to as a thrust washer, in each case in the area of two axial end-face sides 6 of the radial bearing part.

Figure 3:
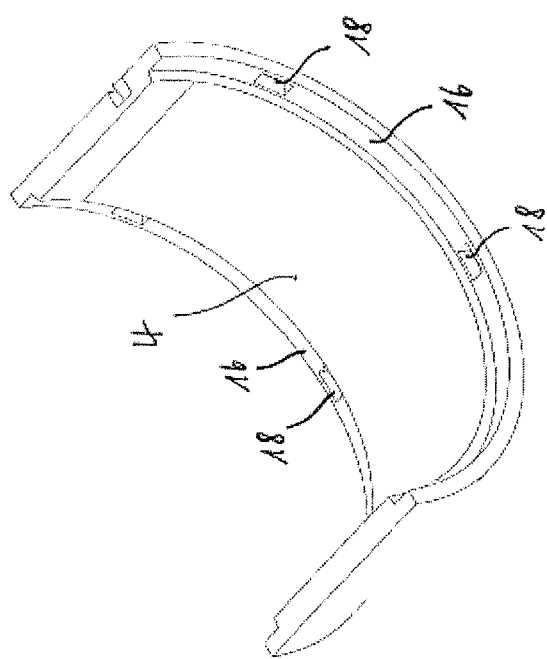
FIG. 3 shows a perspective view of a radial bearing part of the flanged bearing shell according to FIG. 1.

FIG. 3 shows a perspective view of the radial bearing part 4. FIG. 1 also illustrates an axial direction 10, a circumferential direction 12 concentric with respect to the axial direction, and a radial direction 14 of the flanged bearing shell 2.

It is apparent from FIG. 3 that retaining recesses 18 for fastening the respective axial bearing part 8 are provided in edge areas 16, two by way of example, that extend in the circumferential direction 12 of the radial bearing part 4.

According to the invention, the axial bearing part 8 does not have a consistently one-piece design in the circumferential direction 12; rather, in the illustrated case, by way of example three segments 20 are formed which are initially manufactured and obtained separately from one another, and then arranged in the area of the axial end-face side 6 of the radial bearing part 4 in their intended assembly position. Only then are they integrally joined together by a weld connection. A preliminary separating joint 22 between the segments 20 is indicated in each case in FIG. 1. The weld seam 24 is then provided along this separating joint 22 in the finished state, as the result of which the segments 20 abut one another, and at the same time the axial bearing part 8 thus formed is captively held on the radial bearing part 4, but with slight play at least in the axial direction 10. In the preferred case illustrated by way of example, the respective segments 20 are bordered by an edge 26 or a flank that extends in each case in the radial direction 14. With this edge 26 or with this flank, the middle segment 20 and the adjoining segments 20 rest against one another, forming a separating joint 22 or butt joint, and are nondetachably joined together by applying the weld seam 24.

Figure 4:
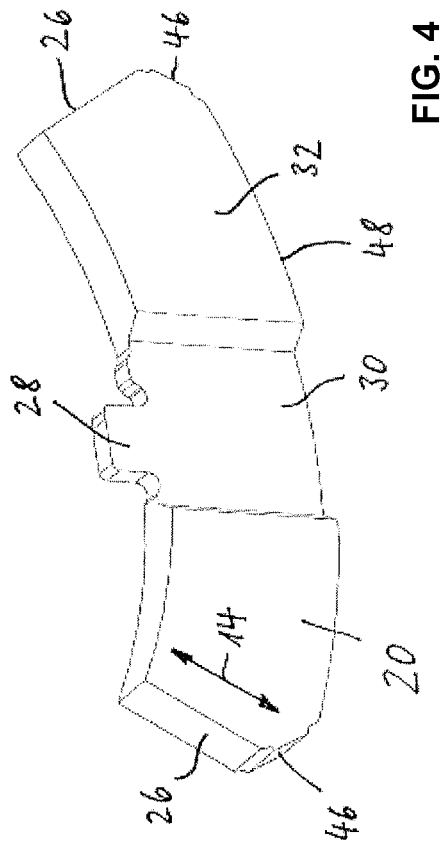
FIG. 4 shows a perspective view of a segment for forming an axial bearing part of the flanged bearing shell according to FIG. 1.

It is most clearly apparent from FIG. 4 that the segment 20 illustrated therein has an inwardly projecting retaining tongue 28, i.e., that projects essentially inwardly in the radial direction 14. The particular retaining tongue 28 has a design that is complementary with the above-mentioned retaining recess 18 of the radial bearing part 4 in such a way that a particular segment 20 is situated in the area of the axial end-face side 6 of the radial bearing part 4 and can be mounted in its intended assembly position, in which the particular retaining tongue 28 engages with the associated retaining recess 18 of the radial bearing part 4. In this state, the segments 20 in the circumferential direction 12 then essentially lie with their edges 26 at least substantially in flush abutment with one another, so that they may be nondetachably joined together by applying the respective weld seam 24. As a result, the entire axial bearing part 8 formed by the three, for example, segments 20 has play at least in the axial direction 10, but is nondetachably held on the radial bearing part 4, and in particular without having to carry out material-deforming measures to achieve a captive hold. The play is brought about by dimensioning the retaining recesses 18 to be slightly larger than the retaining tongues 28 that engage with them. After the segments 20 are joined together, a rear engagement with respect to all directions, and thus a captive arrangement, is still achieved. An integrally joined connection between the axial bearing part 8 and the radial bearing part 4, which would also prevent the arrangement with play, is not present.

Also apparent are lubricating grooves 30 that extend in the radial direction 14 and that are formed by machining from a sliding surface 32 of the axial bearing part 8 or a segment 20 thereof.

Figure 5:
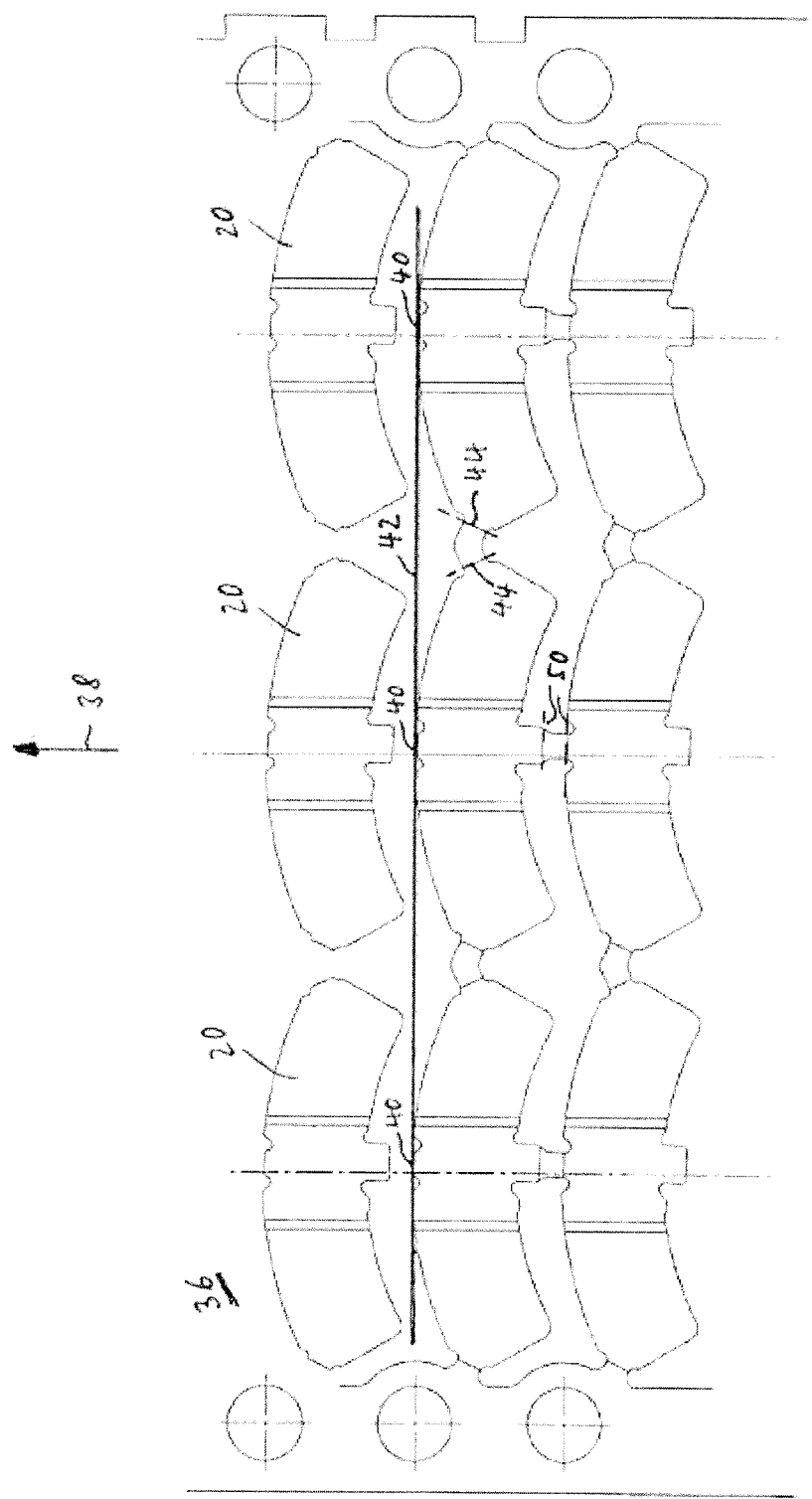
FIG. 5 shows a schematic illustration of an example of a division of a punching pattern of a flat material for forming the segments provided at the respective axial bearing part.

Lastly, FIG. 5 schematically illustrates a flat material 36, in particular a metallic material or metal composite 36; a machine direction 38 for the feed or clocked advancement of the flat material 36 is also indicated. Also indicated is a punching pattern for the particular segments 20 for manufacturing the axial bearing part 8. In the preferred illustrated case by way of example, the segments 20 are provided orthogonally with respect to the machine direction 38 for three adjacent pieces. These three segments are situated symmetrically with respect to one another with regard to the machine direction 38 in such a way that a respective vertex 40 of each segment is situated on the same line 42, orthogonal to the machine direction 38. It is shown that, due to the multiple sections of the axial bearing part according to the invention, very cost-efficient manufacture of the axial bearing part 8 is possible, since the cutting waste may be significantly reduced. Based on the pattern schematically illustrated in FIG. 5, separating cuts 44 are made in the transition between two adjoining segments 20 that are still attached to one another, resulting in the cutout contour 46, illustrated in FIG. 3, in the transition of a radially outer circumferential edge 48 to the radially inwardly extending edge 26. It is also illustrated that the segments 20, in the machine direction 38 by way of example here, remain attached to one another until they are separated from one another by separation steps 50.

What is claimed is:

1. An assembled half shell-shaped flanged bearing shell for a crankshaft bearing point in an internal combustion engine, having an axial direction, a circumferential direction concentric with respect to the axial direction, and a radial direction, and having a half shell-shaped radial bearing part and having a disk-shaped axial bearing part that is fastenable in the area of an axial end-face side of the radial bearing part, wherein the radial bearing part has a radially inner sliding surface facing a sliding partner, and an edge area that extends in the circumferential direction, and wherein the axial bearing part extends essentially in a radial plane, orthogonally with respect to the axial direction, and has at least two inwardly projecting retaining tongues that extend essentially in the radial plane and that are brought into engagement with a respective retaining recess in the edge area of the radial bearing part, wherein the axial bearing part is captively held at the radial bearing part, characterized in that the axial bearing part is formed from at least three segments that adjoin one another in the circumferential direction and that are nonreleasably joined together via a weld seam between every two segments, wherein the respective weld seam does not include the radial bearing part, and wherein the segments with their retaining tongues are first arranged at the edge area of the radial bearing part so that the retaining tongues engage with the respective retaining recesses in the edge area of the radial bearing part, and only then is the respective weld seam applied between every two segments, as a result of which the axial bearing part thus formed is captively held at the radial bearing part but with play, at least in the axial direction, and without the retaining tongues or the edge area of the radial bearing part having been processed in a material-deforming manner.

2. The flanged bearing shell according to claim 1, characterized in that the multiple segments are not all made of the same materials or do not all have the same material composition.

3. The flanged bearing shell according to claim 1, characterized in that at least one segment that is made of a metal/plastic composite.

4. The flanged bearing shell according to claim 3, characterized in that the metal/plastic composite has a metallic support layer, in particular made of steel, a three-dimensionally porous support layer applied thereto for a polymer-based sliding material impregnated therein, and this sliding material, with tribologically active fillers.

5. The flanged bearing shell according to claim 1, characterized in that all segments have a retaining tongue that extends essentially radially inwardly.

6. The flanged bearing shell according to claim 1, characterized in that three segments are provided for forming a particular axial bearing part.

7. The flanged bearing shell according to claim 6, characterized in that the three segments each have a circumferential length of 55°-65°, or two segments have a shorter circumferential length than a segment situated between them.

8. The flanged bearing shell according to claim 1, characterized by the segments having different circumferential lengths.

9. The flanged bearing shell according to claim 1, characterized in that each of the at least three segments in the radial direction has a cutout on the outside in the transition to an adjacent segment.

10. The flanged bearing shell according to claim 1, wherein the weld seam extends in a radial direction.

11. A method for manufacturing an assembled half shell-shaped flanged bearing shell, characterized in that segments form an axial bearing part and are formed from a flat material, the segments are brought into an intended assembly position on the radial bearing part in which retaining tongues of the segments engage with a respective retaining recess on the edge area of the radial bearing part, and a weld seam is subsequently provided between every two segments, and the axial bearing part is hereby captively held on the radial bearing part but with play, and without the retaining tongues or the edge area of the radial bearing part having been processed in a material-deforming manner.

12. The method according to claim 11, characterized in that the segments that form a particular axial bearing part are in the flat material in each case provided orthogonally with respect to a machine direction of the flat material next to one another for forming.

* * * * *